United States Patent [19]

Ratner

[11] 4,312,381
[45] Jan. 26, 1982

[54] AIR FLOW DAMPING SYSTEM

[75] Inventor: David A. Ratner, Walnut Creek, Calif.

[73] Assignee: Aladdin Heating Corporation, San Leandro, Calif.

[21] Appl. No.: 134,458

[22] Filed: Mar. 27, 1980

[51] Int. Cl.³ .............................................. F16K 11/18
[52] U.S. Cl. ......................................... 137/636; 74/96;
74/436; 137/595; 137/601; 137/865; 165/103;
251/249
[58] Field of Search .......................... 74/96, 98, 436;
137/594, 595, 601, 607, 630.19, 630.2, 636, 862,
865; 165/103; 251/249

[56] References Cited

U.S. PATENT DOCUMENTS

| | | |
|---|---|---|
| 3,066,208 | 11/1962 | Fannon . |
| 3,207,111 | 9/1965 | Giliberty . |
| 3,361,005 | 1/1968 | Carpenter . |
| 3,421,380 | 1/1969 | Mansour . |
| 3,508,604 | 4/1970 | Foust ............................ 165/103 X |
| 3,523,460 | 8/1970 | Beauvais ....................... 137/636 X |
| 3,635,245 | 1/1972 | Canfield ............................ 137/607 |
| 3,847,210 | 11/1974 | Wells ............................. 137/595 X |
| 3,855,873 | 12/1974 | Fletcher . |
| 3,911,953 | 10/1975 | Crombie ............................ 137/595 |
| 4,164,976 | 8/1979 | Timmerman ................... 165/103 X |

FOREIGN PATENT DOCUMENTS 1298805 9/1969 Fed. Rep. of Germany ...... 165/103
611360 10/1960 Italy ..................................... 165/103

Primary Examiner—Robert G. Nilson
Attorney, Agent, or Firm—Phillips, Moore, Weissenberger, Lempio & Majestic

[57] ABSTRACT

A control device for a triple-plenum air conditioning apparatus having a by-pass air duct, a hot air duct and a cold air duct. A first shaft mounted through the by-pass and hot air ducts carries a first by-pass air damper blade and a hot air damper blade at right angles to each other. A second shaft mounted through the by-pass air duct and the cold air duct carries a second by-pass damper blade and a cold air damper blade at right angles to each other. The control device includes a first geneva link on the first shaft, a second geneva link on the second shaft and a third shaft carrying a drive plate with pins for independently actuating the geneva links and a geneva cam for holding one of the geneva links against rotation while the other is being independently actuated. Rotation of the third shaft through one hundred degrees results in rotation of each of the first and second shafts through ninety degrees.

7 Claims, 11 Drawing Figures

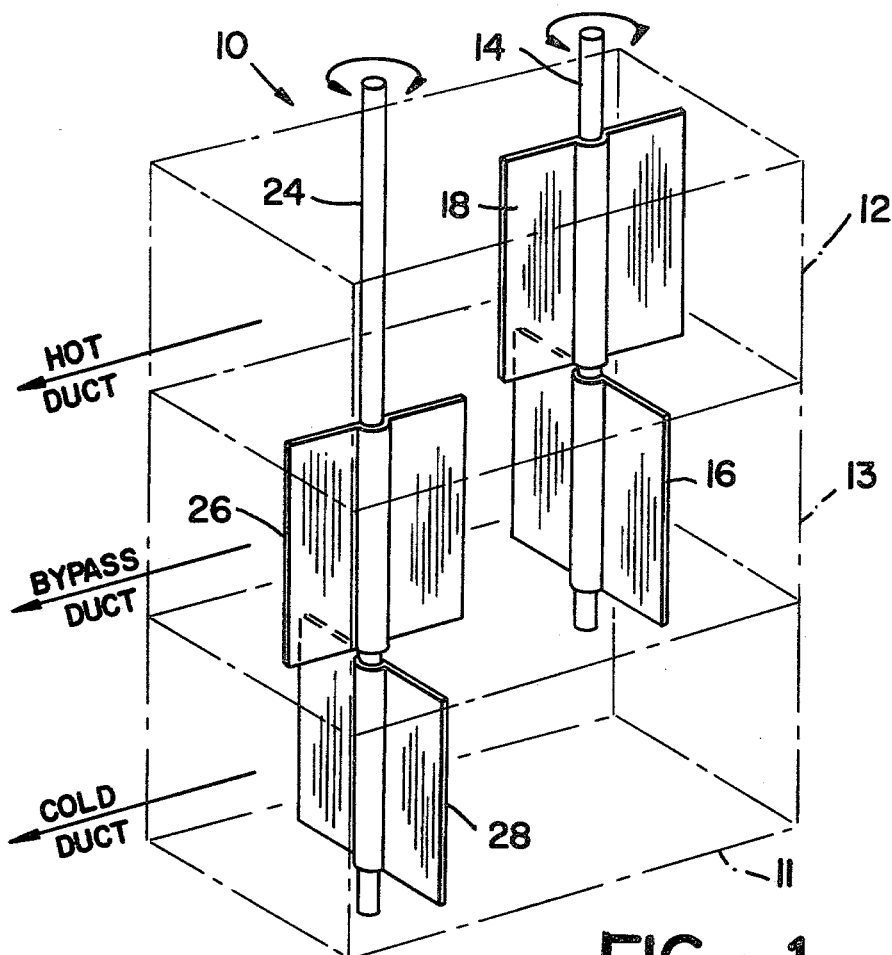
FIG_1
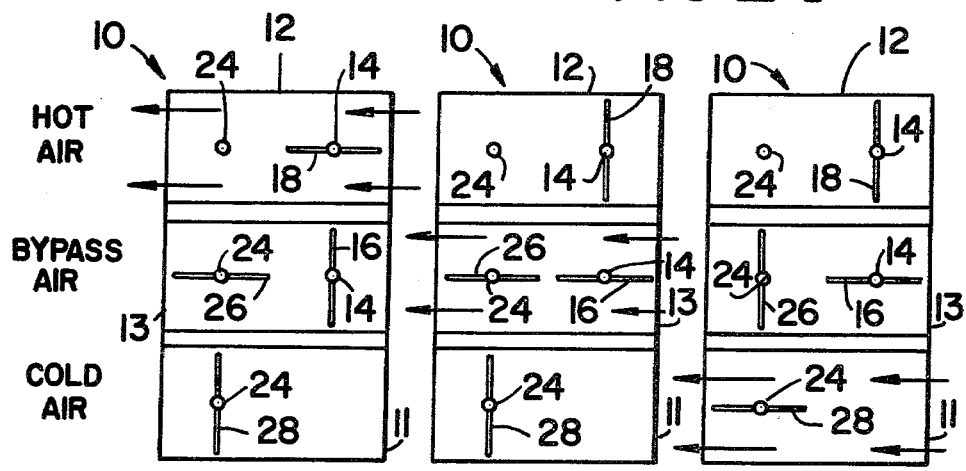
FIG_2a  FIG_2b  FIG_2c

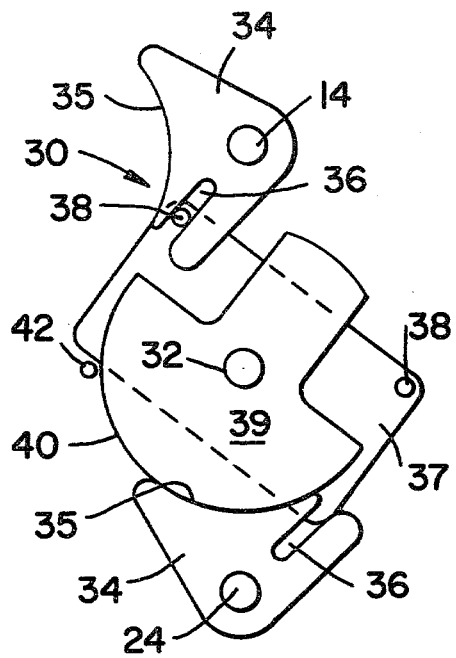
FIG_3
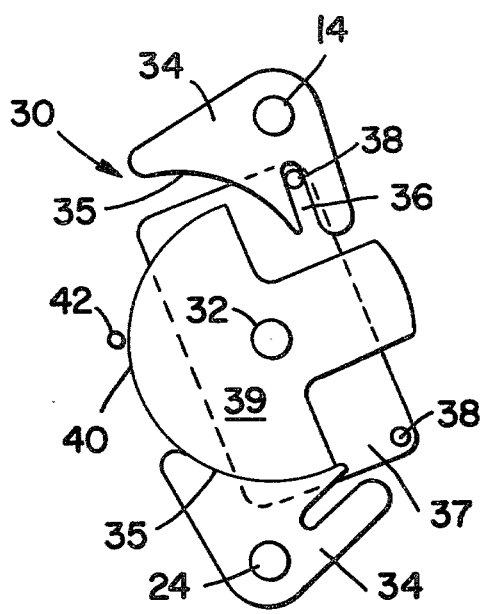
FIG_4
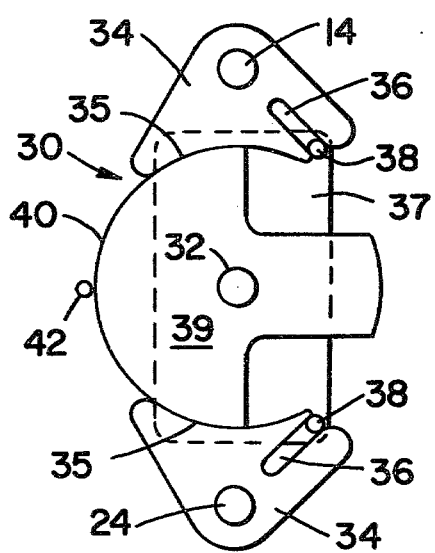
FIG_5
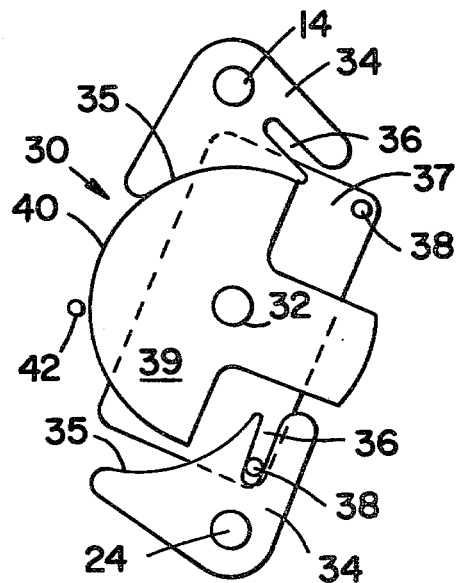
FIG_6

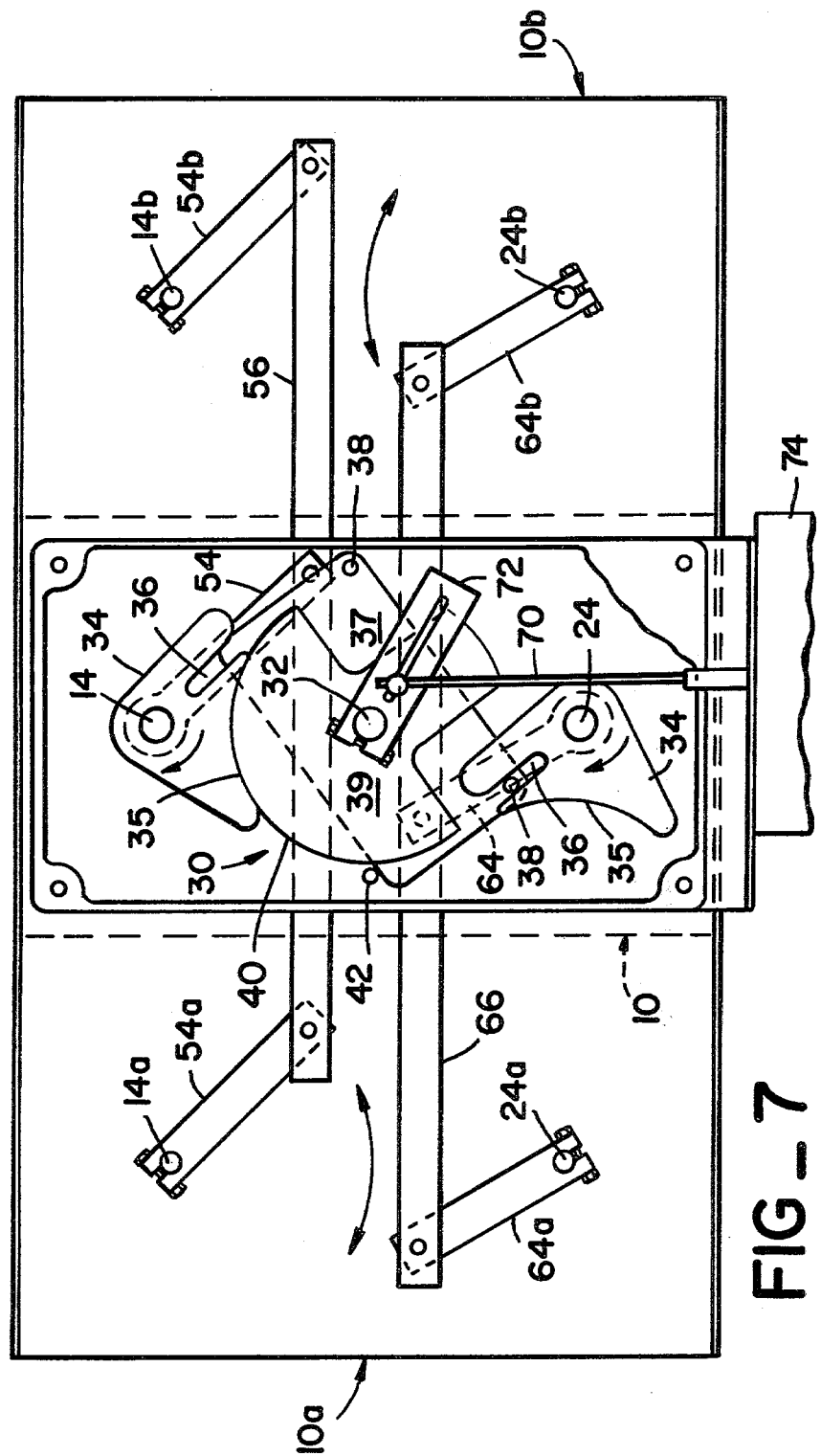
FIG_7

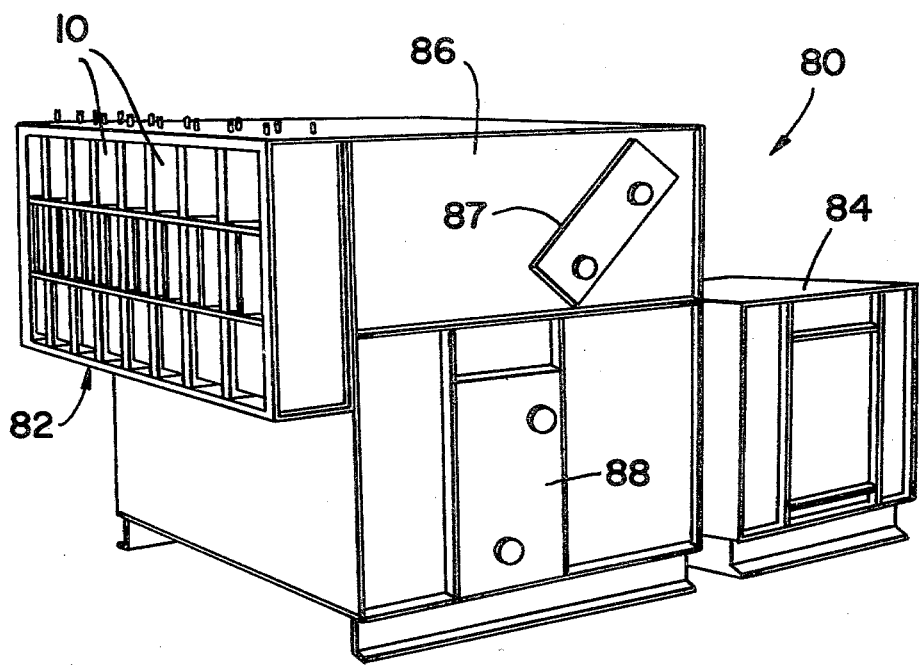
FIG_8
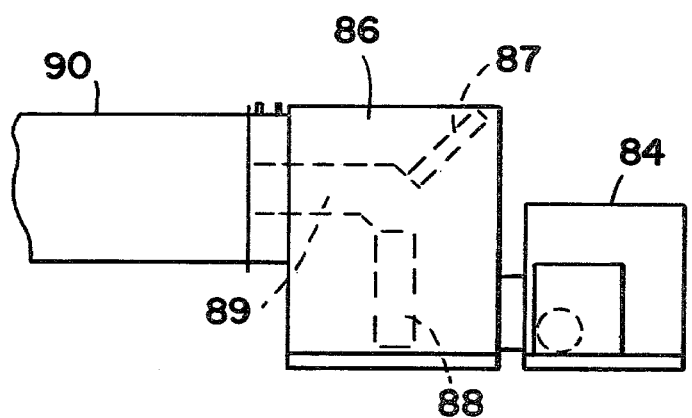
FIG_9

AIR FLOW DAMPING SYSTEM

DESCRIPTION

1. Technical Field

This invention relates generally to triple-plenum air conditioning apparatus and more particularly to an improved air flow damping system for use in such apparatus.

2. Background Art

Usage of triple-plenum air conditioning apparatus has steadily increased in recent years in order to conserve energy by avoiding the wastefulness of mixing heated air with cooled air to obtain a desired air temperature in the space served by such apparatus. Thus in triple-plenum air conditioning apparatus commonly used to condition the air in more than one space in a building from a single source, an air handling device or fan forces air through three separate chambers each having an outlet duct. The first chamber contains a heating device for raising the temperature of the air to produce a plenum of warm or hot air. The second chamber merely serves as a passageway for air thereby providing a plenum of air at ambient temperature. The third chamber contains a device for lowering the temperature of the ambient air thereby providing a plenum of cool or cold air. The outlet ducts for all three passageways are usually made as a unit and extend from the source to the space in which air is to be conditioned.

A temperature sensing device or thermostat in such space controls an appropriate air flow damping system in the outlet ducts of the source in such a way that either heated air or cooled air or a mixture of one or the other with ambient air is delivered to the space in order to provide an air temperature within such space as established by the thermostat. In order to conserve energy, it is necessary that a mixture of heated air and cooled air never be supplied to the space from the source. To this end, the duct for ambient air, generally referred to as by-pass air, is usually interposed between the duct for heated air and the duct for cooled air and a damping system is required which will permit all heated air, a mixture of heated air with by-pass air, all by-pass air, a mixture of by-pass air and cooled air, or all cooled air to be supplied to such space. According to the prior art, such damping systems and their control have been complicated, requiring unusual precision in manufacture and consequent high cost, or have allowed excessive leakage in nominally closed ducts due to difficulties in obtaining correct sequencing and proper closure without imposing undue restriction of the air in passing through the ducts.

U.S. Pat. No. 3,911,953, issued to Allen P. Crombe et al, Oct. 14, 1975, discloses a three-plenum mixing damper which attempts to overcome some of the problems of the prior art through the use of resilient mounting of damper blades. However, the resilient mounting of the damper blades introduces complication and expense into the fabrication of such a damper and in addition imposes a limitation on the operating life of the damper system. In normal use, such resilient mounting requires additional force to operate the damping system and introduces the possibility of jamming of the damper blades. Furthermore, once the damper has been installed into a duct system, the springs and blades are inaccessible and repairs or adjustment of the damper after installation would be virtually impossible without removing the complete duct manifold.

The present invention is directed to overcoming one or more of the problems as set forth above.

DISCLOSURE OF THE INVENTION

In one aspect of the present invention, a triple-plenum air conditioning apparatus having a by-pass air duct, a hot air duct and a cold air duct is provided with a pair of spaced shafts each extending within the by-pass duct and at least a different one of the hot air duct and the cold air duct. A first generally planar by-pass air damper blade is rigidly mounted on a first one of the pair of shafts within the by-pass air duct and a generally planar hot air damper blade is rigidly mounted on such first shaft within the hot duct at right angles to the by-pass air damper blade. A second by-pass air damper blade is rigidly mounted on the second one of the pair of shafts within the by-pass air duct and a cold air damper blade is rigidly mounted to the second shaft within the cold air duct at right angles to the second by-pass damper blade. A control means is provided for normally maintaining both the first and second by-pass air damper blades in their fully open position and for rotating each shaft independently while maintaining the other stationary, to reciprocate one by-pass air damper blade between its fully open position and its fully closed position while reciprocating one of the hot air damper blade and cold air damper blade between its fully closed position and its fully open position.

In another aspect of this invention, an improved double geneva control system for rotating each of two shafts independently while maintaining the other stationary is provided.

BRIEF DESCRIPTION OF THE DRAWING

This invention will be more fully understood from the following detailed description when read in conjunction with the appended drawing wherein:

FIG. 1 is a perspective view of an air flow damping system according to a preferred embodiment of this invention with the air ducts indicated in phantom and the damper blades set to provide a hot air flow only.

FIG. 2a is a schematic representation of the air flow damping system of FIG. 1 showing the damper blades in position to provide a hot air flow only.

FIG. 2b is a schematic representation similar to FIG. 2a but showing the damper blades set in position to provide by-pass air flow only.

FIG. 2c is a schematic representation similar to FIGS. 2a and 2b but showing the damper blades set in position to provide cold air flow only.

FIG. 3 is a top plan view of the control device according to the preferred embodiment of this invention for setting the position of the damper blades with the unique double geneva mechanism of such control device in position to set the damper blades as shown in FIGS. 1 and 2a.

FIG. 4 is a top plan view similar to FIG. 3 but showing the unique double geneva mechanism in position to set two of the damper blades to a position intermediate the positions shown in FIGS. 2a and 2b and in order to provide an air flow which is a mixture of hot air and by-pass air.

FIG. 5 is a top plan view similar to FIGS. 3 and 4 but with the unique double geneva mechanism in position to set the damper blades as shown in FIG. 2b.

FIG. 6 is a top plan view similar to FIGS. 3, 4 and 5, but with the unique double geneva mechanism shown in position to set the other two of the damper blades to a position intermediate that shown in FIGS. 2b and 2c to provide an air flow which is a mixture of cold air and by-pass air.

FIG. 7 is a top plan view of an air flow manifold including three sets of air ducts as shown in FIG. 1, each set extending from the bottom to the top of the figure and each set including a separate air flow damping system interconnected by mechanical links for simultaneous control by a device as shown in FIGS. 3-6 with the unique double geneva mechanism shown in position to position the damper blades in each set of air ducts as shown in FIG. 2c.

FIG. 8 is a perspective view of a triple-plenum air conditioning apparatus including a manifold having multiple sets of triple air ducts as shown in FIG. 1, each equipped with an air flow damping system according to this invention but with the control mechanism ommitted.

FIG. 9 is a simplified side view of FIG. 8 with the air flow passageways through the apparatus and the heating and cooling elements thereof indicated by dotted lines.

DETAILED DESCRIPTION OF PREFERRED EMBODIMENT

Referring to FIG. 1, an air flow damping system 10 for a triple-plenum air conditioning apparatus according to the preferred embodiment of this invention is shown. In FIG. 1, portions of the air flow ducts of the triple-plenum air conditioning apparatus are shown in phantom in vertically stacked array. According to this embodiment of the invention, the air ducts have common generally rectangular cross-sections and share common walls. Thus, the lower duct 11 communicates with a cold air plenum, passing cold air therethrough from right to left. Similarly, the upper air duct communicates with a hot air plenum passing heated air therethrough from right to left. The central duct 13 communicates with a plenum of air at ambient temperature providing for a flow of ambient air from right to left thereby by-passing the heating element used to provide the hot air plenum and cooling unit used to provide the cold air plenum.

A first shaft 14 is mounted through the upper wall of the hot air duct 12 and common wall between the hot air duct 12 and by-pass air duct 13 for rotation about its axis. A first generally planar by-pass air damper blade 16 is rigidly mounted on the shaft 14 within the by-pass air duct 13. The damper blade 16 is dimensioned to close the by-pass air duct 13 to the passage of air when in the position shown in FIG. 1 and to open the by-pass air duct to the passage of air when the shaft 14 is rotated 90° from the position shown in FIG. 1.

A generally planar hot air damper blade 18 is rigidly mounted on the first shaft 14 within the hot air duct and extends at right angles to the by-pass air damper blade 16. Thus, as shown in FIG. 1, the hot air damper blade 18 is positioned to allow passage of hot air through the duct 12 and is dimensioned to close the duct 12 to the passage of hot air when the shaft 14 is rotated 90° from the position shown in FIG. 1.

A second shaft 24 extends within the by-pass air duct 13 and cold duct 11 and is mounted for rotation about its axis through the walls of such ducts preferably extending outwardly of the upper wall of the hot air duct 12 in spaced relation to the first shaft 14. A second generally planar by-pass air damper blade 26 is rigidly mounted on the second shaft 24 within the by-pass air duct 13. The second by-pass air damper blade 26 is identical to the first by-pass air damper blade 16 and functions in the same way. A generally planar cold air damper blade 28 is rigidly mounted to the second shaft 24 within the cold air duct 11 and extends at right angles to the second by-pass air duct 26. In the position shown in FIG. 1, the cold air damper blade 28 closes the cold air duct while the second by-pass air damper blade 26 is positioned to allow free passage of by-pass air.

It will be understood that the air ducts 11, 12 and 13 could be of circular oval or other cross-sectional configuration with the damper blades 16, 18, 26 and 28 configured for rotational movement therewithin. Furthermore, the shafts 14 and 24 need not be centrally located as shown in FIG. 1. According to this invention, it is only necessary that the two damper blades associated with each shaft be rigidly mounted to such shaft in such relationship to each other that a 90° rotation of the shaft will cause one to close the duct in which it is mounted and the other to open the duct within which it is mounted.

Referring to FIG. 2a, the air flow control damping system 10 as shown in FIG. 1 is represented schematically. Thus, the hot air duct is shown in horizontal cross-section with the hot air damper blade 18 positioned to open the hot air duct 12 for free passage of hot air therethrough. Similarly, the by-pass air duct 13 is shown in horizontal cross-section with the first by-pass air damper blade 16 positioned to close the duct 13 to the passage of by-pass air although the second by-pass air damper blade 26 is in its open position with respect to the duct 13. Finally, the cold air duct 11 is shown in horizontal cross-section with the cold air damper blade 28 positioned to close the duct 11 to the passage of cold air therethrough. Thus, as shown in FIGS. 1 and 2a, only hot air is allowed to pass through the air flow damper system 10.

As the first shaft 14 is rotated 90° in either direction to move the damper blades 16 and 18 from their positions shown in FIG. 2a to their positions shown in FIG. 2b, the flow of hot air through the duct 12 will be steadily reduced to substantially zero and simultaneously the flow of by-pass air through the duct 13 will be steadily increased from zero to maximum. Thus, rotation of the first shaft 14 by an amount less than 90° will produce simultaneous flow of both hot air and by-pass air enabling any desired mixture thereof to be obtained.

If the shaft 14 is held against rotation with the damper blades 16 and 18 in their positions shown in FIG. 2b and the second shaft 24 is rotated 90° in either direction, the second by-pass air damper blade 26 will be moved from its position shown in FIG. 2b to its position shown in FIG. 2c so that it will close the duct 13 to the flow of by-pass air therethrough. Simultaneously, the cold air damper blade will be moved from its position shown in FIG. 2b to its position shown in FIG. 2c opening the duct 11 to the flow of cold air therethrough. Rotation of the second shaft 24 by amounts less than 90° will enable any selected mixture of cold air with by-pass air to be obtained in the flow through the air flow control system 10.

From the above, it will be seen that the air flow control damper system according to this invention makes it impossible for a flow of hot air and a flow of cold air to occur simultaneously through the system. Thus the wastefulness of mixing heated air with cooled air is completely eliminated, although a flow of all hot air can be obtained as shown in FIG. 2a, a flow of all by-pass air may be obtained as shown in FIG. 2b and a flow of all cold air may be obtained as shown in FIG. 2c with any mixture of hot air and by-pass air or any mixture of cold air and by-pass air being obtainable.

Referring to FIGS. 3 through 6, a top plan view of a control device 30 according to the preferred embodiment of this invention for selective movement of either of the shafts 14 and 24 through 90° of rotation while holding the other of the shafts against rotation is shown. The control device 30 includes a unique double geneva mechanism including an actuating shaft 32 mounted for rotation about an axis parallel to the axes of rotation of the shafts 14 and 24 which are in turn parallel to each other as shown in FIGS. 1 and 2. Each of the shafts 14 and 24 is provided with one of a pair of identical geneva links 34 in mirror image relation to each other. Each of the geneva links 34 has a concave circular surface 35 and a substantially tangential rectilinear slot 36 formed therein. In the preferred embodiment of this invention, a rectangular drive plate 37 is rigidly mounted on the actuating shaft 32 for rotation thereby with its major planes extending normally to the axis of rotation of the actuating shaft 32. The drive plate 37 is located to pass immediately under the geneva links 34 and is provided with a pair of drive pins 38 projecting upwardly from the drive plate 37 and dimensioned and located to each engage a different one of the slots 36 of the geneva links 34. On top of the drive plate 37 and also rigidly fixed to the shaft 32 for rotation thereby is a geneva cam 39 having a semicircular convex surface 40 adapted to mate with the surfaces 35 of the geneva links 34. In the preferred embodiment of this invention, a stop pin 42 is rigidly mounted adjacent the semicircular convex surface of the geneva cam 39 and adapted to engage the drive plate 37 to limit rotation of the shaft 32, drive plate 37 and geneva cam 39 to about 100° about the axis of the shaft 32.

Thus, in FIG. 3, the double geneva mechanism of the control device 30 is shown with the elements thereof positioned at the limit of counter-clockwise rotation of the shaft 32 established by abutment of the rear edge of the plate 37 against the stop pin 42. In this position the shaft 14 has been rotated in a clockwise direction by engagement of the drive pin 38 with the slot 36 of the geneva link 34 thereon and the damper blades 16 and 18 carried by the shaft 14 are positioned as shown in FIGS. 1 and 2a. The convex surface 40 of the geneva cam 39 is in mating engagement with the concave surface 35 of the geneva link 34 carried by the shaft thereby holding the shaft 24 against rotation with the damper blades 26 and 28 carried by the shaft 24 in their positions as shown in FIGS. 1 and 2a.

Referring to FIG. 4, the elements of the double geneva mechanism of the control device 30 are shown as positioned by rotation of the shaft 32 in a clockwise direction by about 25° from the limit position shown in FIG. 3. The shaft 14 has been rotated in a counter-clockwise direction by about 45° through the action of the drive pin 38 in the slot 36 of the geneva link carried by the shaft 14. Thus the damper blades 16 and 18 carried by the shaft 14 will be positioned about half way between their positions as shown in FIGS. 2a and 2b allowing a mixture of hot air and by-pass air to flow through the air flow damper system 10. At the same time, the shaft 24 is held against rotation by the continued mating engagement of the convex surface 40 on the geneva cam 39 with the concave surface 35 on the geneva link 34 carried by the shaft 24. Thus, the damper blades 26 and 28 carried by the shaft 24 are maintained in their position as shown in FIGS. 1, 2a and 2b.

Referring to FIG. 5, continued rotation of the shaft 32 in a clockwise direction to the midpoint of its rotational movement, will complete the rotation of the shaft 14 through a full 90° in a counter-clockwise direction, thereby positioning the damper blades 16 and 18 carried thereby as shown in FIG. 2b. In this position, the concave surface 35 of the geneva link 34 carried by the shaft 14 will be brought into mating engagement with the convex surface 40 of the geneva cam 39 and at the same time, the drive pin 38 will leave its engagement with the slot 36 of the geneva link 34 carried by the shaft 14. The concave surface 35 of the geneva link 34 carried by the shaft 24 will remain in mating engagement with the convex surface 40 of the geneva cam 39 and the drive pin 38 will enter into engagement with the slot 36 of the geneva link 34 carried by the shaft 24. Thus, both the shaft 14 and the shaft 24 will be maintained against rotation by the geneva cam 39 in their positions shown in FIG. 2b.

Continued rotation of the shaft 32 in a clockwise direction will cause the elements of the double geneva mechanism of the control device to assume the positions shown in FIG. 6. As shown in FIG. 6, the shaft 14 will be held against rotation by the mating engagement of the convex surface 40 of the geneva cam 39 with the concave surface 35 of the geneva link 34 carried by the shaft 14. However, the shaft 24 will be rotated in a counter-clockwise direction by the engagement of the drive pin 38 with the slot 36 of the geneva link 34 carried by the shaft 24. Thus, the damper blades 26 and 28 carried by the shaft 24 will be rotated to a position intermediate positions thereof shown in FIGS. 2b and 2c while the damper blades 16 and 18 carried by the shaft 14 will be held in their positions as shown in FIGS. 2b and 2c. In such position, a mixture of by-pass air and cold air will flow through the air flow damper system 10.

FIG. 7 shows the double geneva mechanism of the control device 30 shown in FIGS. 3 through 6 together with additional elements of the control device 30. Thus, the reference numerals of FIGS. 3 through 6 are used in FIG. 7 to identify corresponding elements which elements are shown at the limit of the rotation of the shaft 32 in a clockwise direction with the rear edge of the plate 37 abutting the stop 42. In this position, the shaft 24 has been rotated 90° from its position as shown in FIGS. 3 through 5 through the engagement of the drive pin 38 with the slot 36 of the geneva link 34 carried by the shaft 24. Thus, the damper blades 26 and 28 carried by the shaft 24 have been moved to their positions shown in FIG. 2c and at the same time, the shaft 14 has been held against rotation to maintain the damper blades 16 and 18 carried by the shaft 14 in their positions as shown in FIGS. 2b and 2c. Thus, a flow of all cold air is provided through the air flow damper system 10 and rotation of the shaft 32 in a counter-clockwise direction will produce a reversal in the operation of the double geneva mechanism of the control device 30 of the air flow damper system 10 as described above.

An important advantage of the double geneva mechanism of the control device 30 according to this invention is the smooth transition in rotational movement of the shafts 14 and 24. Thus, referring to FIG. 5, it will be seen that rotational movement of the shaft 32 in either direction from the position shown in FIG. 5 will result in rotational movement of one or the other of the shafts 14 or 24 without lost motion. This is necessary in order to insure control of the temperature of the air flow at and about the ambient air temperature. Such smooth transition is provided by the use of the pair of drive pins 38 properly spaced from each other and located with respect to the pair of geneva links 34 together with the proper dimensioning of the geneva cam 39 to insure immediate response of one or the other of the shafts 14 and 24 to rotation of the shaft 32.

Another important advantage of this invention is that the air flow damper system 10 including control device 30 requires little power in operation. The forces exerted by the air flow on the damper blades tend to be balanced at all times and there are no resilient elements in the air flow damper system to add to the forces required in operation. Thus, simple rotational movement of the damper blades in which one duct is being closed at the same time that another duct is being opened will require little force and it is possible to use a single control device 30 to control a number of damper systems 10 as shown in FIG. 7.

FIG. 7 illustrates a manifold including three air flow damper systems as shown in FIG. 1 in side-by-side array. Thus, the dotted lines indicate a centrally located air flow damper system 10 including shafts 14 and 24 directly connected to the control device 30 as described hereinabove. A second air flow damper system 10a including shafts 14a and 24a is shown contiguous to the air flow damper system 10 on the left and a third air flow damper system 10b including shafts 14b and 24b is shown contiguous to the air flow damper system 10 on the right. The air flow damper systems 10, 10a and 10b are all identical to each other and the shafts 14, 14a and 14b each have a lever arm 54, 54a and 54b rigidly affixed thereto. A mechanical link or bar 56 is pivotally connected at one of its ends to lever arm 54a and at the other of its ends to lever arm 54b with the lever arm 54 pivotally connected to the link 56 at its center. Similarly, each of the shafts 24, 24a and 24b has a lever arm 64, 64a and 64b rigidly affixed thereto. A mechanical link or bar 66 has one end pivotally connected to the lever arm 64a and its other end pivotally connected to lever arm 64b with the lever arm 64 pivoted thereto at its center. In this way, rotation of the shafts 14, 14a and 14b are ganged together and rotation of the shafts 24, 24a and 24b are ganged together. As shown in FIG. 7, the shaft 32 may be rotated by means of a push rod 70 acting on a slotted lever arm 72 which is rigidly fixed to the shaft 32. The push rod 70 may be actuated by an appropriate thermostatically controlled electromagnetic or pneumatic device 74 as indicated in FIG. 7. Since the identical damper blades 16 and 18 are rigidly fixed to the shafts 14, 14a, 14b, at right angles to each other and identical damper blades 26 and 28 are rigidly fixed to the shafts 24, 24a and 24b at right angles to each other with the shafts 14, 14a, 14b and 24, 24a, 24b being simply mounted for rotation, there is substantially no possibility of malfunction requiring adjustment within the air flow damper system. Instead, adjustments of the shafts 14 and 24 with respect to each other and with respect to shafts 14a, 14b, 24a, 24b may be easily made from outside the air flow damper system. The only parts of the air flow damper system which are subjected to any wear are located outside the air flow damper system as shown in FIG. 7 where they may be easily replaced, repaired or adjusted as required.

Referring to FIGS. 8 and 9, air conditioning apparatus 80 to which the air flow damper system according to this invention may be applied with advantage is shown. In FIG. 8, a manifold 82 including eight side-by-side air flow damper systems 10 according to this invention, is shown. FIG. 8 does not include a showing of a control device for the air flow damping systems 10 since such systems may be ganged together in any desired pattern. In other words, all eight of the damper systems 10 could be operated by a single control device 30 as described hereinabove. Alternatively, as desired, the air flow damper systems 10 may be ganged together in groups of any number for operation by a separate control device 30, or each operated independently by separate control devices 30.

The air conditioning apparatus 80 of FIGS. 8 and 9, comprises a fan unit 84 adapted to force ambient air into the conditioning unit 86 thereof. As best shown by the dotted lines in FIG. 9, the conditioning unit 86 provides three separate air passageways the upper one of which, for example, may be provided with a heating unit 87 and the lower one of which may be provided with a cooling unit 88 with the center passageway 89 simply providing for the straight through passage of ambient air. The passageways are connected to the ducts of the air flow damper system 10 as described hereinabove, which ducts may open into the desired ductwork 90 for connecting the air conditioning apparatus to the space of the building in which the air is to be conditioned. It will be understood that the ductworks 90 may have a number of branches connected to the manifold in any desired grouping with appropriate control devices 30 for each branch of the ductwork 90.

From the above it will be seen that a simple inexpensive air flow damper system is provided according to the teaching of this invention. The system is simple to fabricate and presents no maintenance problems within the ductwork of the apparatus. The air flow damper system may be easily adjusted from the outside to insure efficient operation and any parts requiring maintenance or repair are readily accessible. The air flow damper system is subjected to balanced forces by the air flow thereby requiring small forces to control the system and a smooth transition from all heated air through desired mixtures of heated air with ambient air, all ambient air, desired mixtures of ambient air with cooled air, and all cooled air, is provided by the control system according to the teaching of this invention. This invention is readily applicable to very large units requiring a manifold arrangement of air flow damping systems and to smaller apparatus in which a single air flow damping system will suffice. The inadvertent mixing of heated air with cooled air is eliminated without resorting to mechanisms which might limit the life of the unit in operation or require excessive forces for operation thereof. It is believed that those skilled in the art will find many applications for and make obvious modifications to the device as disclosed hereinabove within the scope of the following claims.

What is claimed is:

1. In a triple-plenum air conditioning apparatus having a by-pass air duct, a hot air duct, and a cold air duct, the improvement comprising:

(a) a first shaft mounted through said by-pass air duct and said hot air duct for rotation about its axis;

(b) a first generally planar by-pass air damper blade rigidly mounted on said first shaft within said by-pass air duct and adapted to close said by-pass air duct when positioned transversely of said by-pass air duct by said rotation of said first shaft;

(c) a generally planar hot air damper blade rigidly mounted on said first shaft within said hot air duct at right angles to said by-pass air damper blade and adapted to close said hot air duct when positioned transversely of said hot air duct by said rotation of said first shaft;

(d) a second shaft in spaced relation to said first shaft mounted through said by-pass air duct and said cold air duct for rotation about its axis;

(e) a second generally planar by-pass air damper blade rigidly mounted on said second shaft within said by-pass air duct and adapted to close said by-pass air duct when positioned transversely of said by-pass air duct by said rotation of said second shaft;

(f) a generally planar cold air damper blade rigidly mounted on said second shaft within said cold air duct at right angles to said by-pass air damper blade and adapted to close said cold air duct when positioned transversely of said cold air duct by said rotation of said second shaft; and (g) a common control device external of said by-pass air, hot air and cold air ducts for rotating both said first shaft and said second shaft independently of each other and for holding each of said first shaft and said second shaft against rotation when not being rotated by said common control device for rotating said first shaft and said second shaft independently of each other, said common control device including a first geneva link comprising a plate having an open ended slot therein mounted on the projecting end of said first shaft transverse of its axis with said slot extending radially of said first shaft, a second geneva link comprising a plate having an open ended slot therein mounted on the projecting end of said second shaft transversely of its axis in generally planar alignment with said first geneva link with said slot extending radially of said second shaft, a third shaft mounted for rotation about its axis extending in parallel equal spaced relation between said first and second shafts, a drive plate mounted on said third shaft for rotation by said third shaft with a surface thereof in overlapping generally parallel relation to corresponding surfaces of said first and second geneva links, and a pair of drive pins projecting from said surface of said drive plate each engaging the open end of the slot in a different one of said first and second geneva links and being dimensioned to be received in said slot.

2. Air conditioning apparatus as claimed in claim 1 wherein each of said first and second geneva links has a concave circular edge surface substantially tangent to said slot therein and a geneva cam having a semicircular convex edge surface dimensioned to mate with said concave edge surfaces of said first and second geneva links is mounted on said surface of said drive plate for rotation therewith, said semicircular edge surface of said geneva cam being concentric with said third shaft and equally spaced from said pair of drive pins.

3. Air conditioning apparatus as claimed in claim 2 wherein said open ended slots in said first and second geneva links and said pair of drive pins are located and dimensioned with respect to each other to provide independent reciprocal rotation through ninety degrees of each of said first and second shafts upon reciprocal rotation of said third shaft through about one hundred degrees.

4. Air conditioning apparatus as claimed in claim 3 wherein said first and second by-pass air damper blades are each positioned to fully open said by-pass air duct to the flow of by-pass air when said pair of drive pins are each positioned at the open end of a different one of said open ended slots in said first and second geneva links and wherein a stop means is provided to limit reciprocal rotation of said third shaft to about fifty degrees in each direction from the position thereof when said pair of drive pins are each positioned at the open end of a different one of said open ended slots.

5. In a control device for alternately rotating each of a pair of damper blades in the air flow damping system of an air conditioning apparatus having a pair of parallel shafts each mounting a different one of said pair of damper blades for rotation, a pair of geneva links each coupled to a different one of said pair of shafts in substantially planar relationship to each other, a rotatable geneva cam disposed to engage both said pair of geneva links when said geneva cam is in an intermediate position whereby both of said shafts are locked by said geneva cam against rotation with said damper blades in open position, geneva drive means associated with said geneva cam and disposed between said geneva link members, the improvement comprising a pair of drive pins providing said geneva drive means with each of said pair of drive pins engaging a different one of said geneva links when said geneva cam is in said intermediate position and each arranged with respect to said geneva cam and mounted for movement with said geneva cam for rotation back and forth between said intermediate position and opposite extreme positions in which one or the other of said shafts is rotated by ninety degrees to place the damper blade associated therewith in closed position and stop means for limiting rotation of said geneva cam and drive pins to about one hundred degrees between said extreme positions.

6. In a control device as claimed in claim 5, a first plurality of additional shafts, each of said first plurality of additional shafts mounting a damper blade and being ganged for rotation with one of said pair of shafts and a second plurality of additional shafts, each of said second plurality of additional shafts mounting a damper blade and being ganged for rotation with the other one of said pair of shafts.

7. Air conditioning apparatus providing an ambient air plenum, a heated air plenum and a cooled air plenum and comprising:

(a) a generally rectangular by-pass air duct of given cross-section communicating with said ambient air plenum;

(b) a generally rectangular hot air duct of said given cross-section contiguous with said by-pass air duct at one side thereof and communicating with said heated air plenum;

(c) a generally rectangular cold air duct of said given cross-section contiguous with said by-pass air duct at the opposite side thereof from said hot air duct;

(d) a first shaft extending through said contiguous sides of said by-pass air duct and said hot air duct normal thereto at the center line thereof and within said by-pass air duct and said hot air duct, said first shaft being mounted for rotation about its axis;

(e) a first generally planar by-pass air damper blade having an external configuration substantially matching said given cross-section rigidly mounted on said first shaft within said by-pass air duct with its major surfaces parallel to the axis of said first shaft;

(f) a generally planar hot air damper blade having an external configuration substantially matching said given cross-section rigidly mounted on said first shaft within said hot air duct with its major surfaces parallel to the axis of said first shaft and normal to said major surfaces of said first by-pass air damper blade;

(g) a second shaft extending through said contiguous sides of said by-pass air duct and said cold air duct normal thereto at the center line thereof and within said by-pass air duct and said hot air duct, said first shaft and said second shaft both projecting from the same non-contiguous side of one of said hot air duct and said cold air duct, said second shaft being mounted for rotation about its axis and spaced from said first shaft by a distance at least equal the width of said given cross-section;

(h) a second generally planar by-pass air damper blade having an external configuration substantially matching said given cross-section rigidly mounted on said second shaft within said by-pass air duct with its major surfaces parallel to the axis of said first shaft;

(i) a generally planar cold air damper blade having an external configuration substantially matching said given cross-section rigidly mounted on said second shaft within said cold air duct with its major surfaces parallel to the axis of said second shaft and normal to said major surfaces of said second by-pass air damper blade;

(j) a first geneva link comprising a plate having an open ended slot therein mounted on the projecting end of said first shaft transverse of its axis with said slot extending radially of said first shaft;

(k) a second geneva link comprising a plate having an open ended slot therein mounted on the projecting end of said second shaft transversely of its axis in generally planar alignment with said first geneva link with said slot extending radially of said second shaft;

(l) a third shaft mounted for rotation about its axis extending in parallel equal spaced relation between said first and second shafts;

(m) a drive plate mounted on said third shaft for rotation by said third shaft with a surface thereof in overlapping generally parallel relation to corresponding surfaces of said first and second geneva links;

(n) a pair of drive pins projecting from said surface of said drive plate each engaging the open end of the slot in a different one of said first and second geneva links and being dimensioned to be received in said slot, each of said first and second geneva links having a concave circular edge surface substantially tangent to said slot therein;

(o) a geneva cam having a semicircular convex edge surface dimensioned to mate with said concave edge surfaces of said first and second geneva links mounted on said surface of said drive plate for rotation therewith, said semicircular edge surface of said geneva cam being concentric with said third shaft and equally spaced from said pair of drive pins, said open ended slots in said first and second geneva links and said pair of drive pins being located and dimensioned with respect to each other to provide independent reciprocal rotation through ninety degrees of each of said first and second shafts upon reciprocal rotation of said third shaft through about one hundred degrees, said first and second by-pass air damper blades each being positioned to fully open said by-pass air duct to the flow of by-pass air when said pair of drive pins are each positioned at the open end of a different one of said open ended slots in said first and second geneva links; and (p) a stop means limiting reciprocal rotation of said third shaft to about fifty degrees in each direction from the position thereof when said pair of drive pins are each positioned at the open end of a different one of said open ended slots.

* * * * *

UNITED STATES PATENT AND TRADEMARK OFFICE
CERTIFICATE OF CORRECTION

PATENT NO. : 4,312,381

DATED : January 26, 1982

INVENTOR(S) : David A. Ratner

It is certified that error appears in the above—identified patent and that said Letters Patent is hereby corrected as shown below:

Column 2, line 17 - After "hot" insert the word --air--

Column 5, line 48 - After "34" insert the word --mounted--

Column 5, line 52 - After "shaft" insert the number --24--

Signed and Sealed this

Twenty-fourth Day of August 1982

[SEAL]

Attest:

Attesting Officer

GERALD J. MOSSINGHOFF

Commissioner of Patents and Trademarks